July 14, 1936.  A. B. RYPINSKI  2,047,228
MOTOR STARTING SYSTEM
Filed Nov. 24, 1933
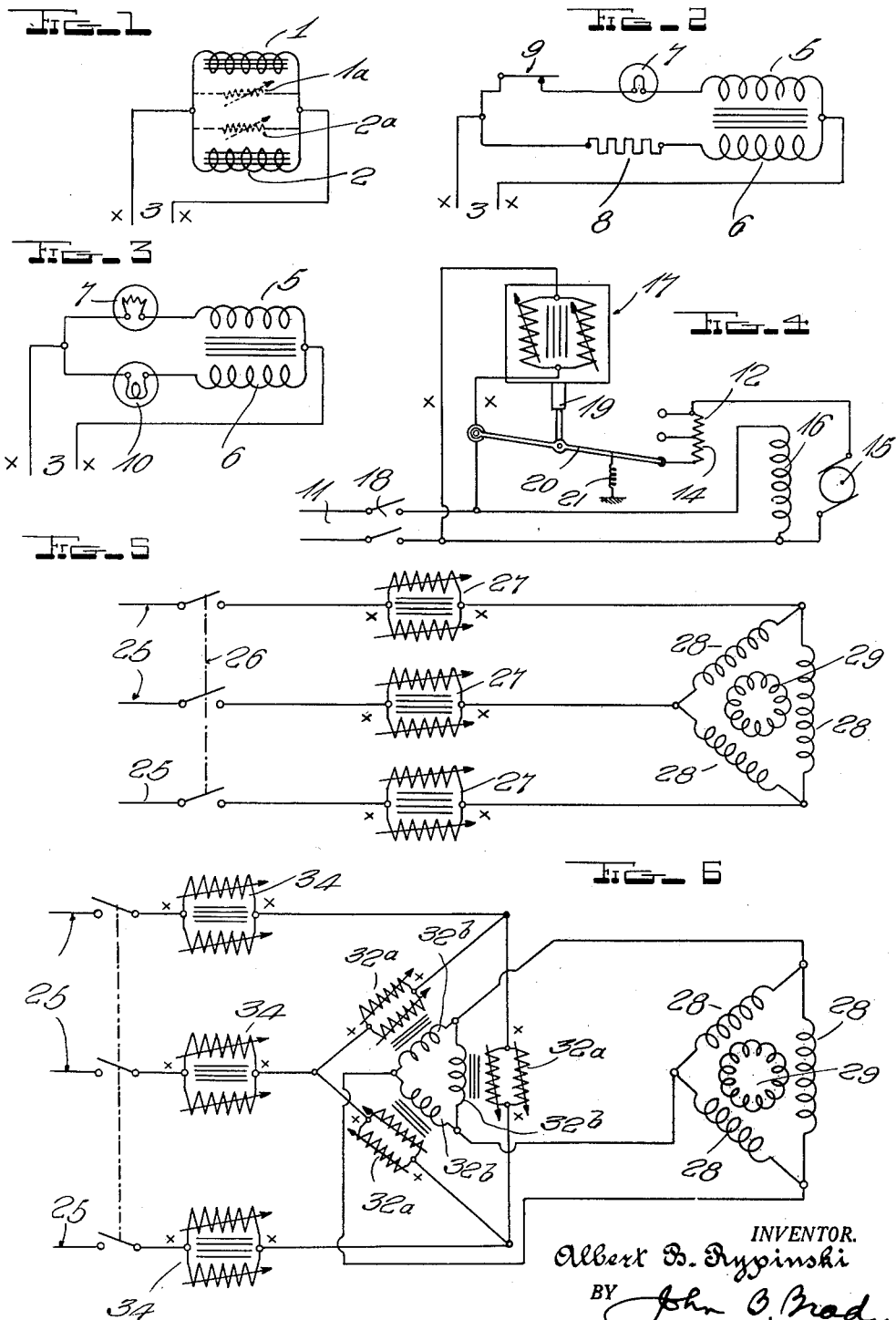
INVENTOR.
Albert B. Rypinski
BY John B. Brady
ATTORNEY.

Patented July 14, 1936

2,047,228

UNITED STATES PATENT OFFICE 2,047,228

MOTOR STARTING SYSTEM

Albert B. Rypinski, Laurelton, Long Island, N. Y.

Application November 24, 1933, Serial No. 699,616

24 Claims. (Cl. 172—289)

This application is a continuation-in-part of my application Serial No. 416,877, for Slow electromagnet, filed December 27, 1929.

In my copending application Serial No. 416,877, filed December 27, 1929, various uses are shown for the slow electromagnet, slow reactor, and slow transformer disclosed therein. Motor starting is referred to, in part, as follows: "Motor starters are often controlled by using a dashpot or other mechanical means to introduce the element of time in the starting of motors. The timed electromagnet of my invention renders such dashpot or other mechanical means unnecessary." The term "electromagnet" was used in a broad sense as embracing any winding developing electromagnetism, whether a solenoid, moving core electromagnet, stationary core electromagnet or other device within the scope of my invention set forth in application Serial No. 416,877.

One of the objects of my invention is to utilize a slow electromagnet to alter the value of a starting resistance in series with a motor and a power supply line by operating switching devices, the time delay being effected by the relatively slow change in magnetism in the electromagnet.

Another object of my invention is to utilize a slow reactor in series between a power supply line and a motor to control the current supplied to the motor in starting.

A further object of my invention is to utilize a slow reactor in series with a power supply line and a motor to control the current supplied to the motor, the reactor having different temperature coefficient materials in two inductively and oppositely coupled windings connected in parallel with each other.

Still another object of my invention is to utilize a slow reactor in series with a power supply line and a motor, to alter the voltage applied to the motor, the reactor having a positive temperature coefficient of resistance material in one winding and a negative temperature coefficient of resistance material in the other.

A still further object of my invention is to utilize a slow reactor in series with a power supply line and a motor to control the current supplied to the motor, the reactor having a positive temperature coefficient of resistance material in one winding and a zero temperature coefficient of resistance material in the other.

Another object of my invention is to utilize a slow reactor in series with a power supply line and a motor, to control the voltage supplied to the motor, the reactor having a negative temperature coefficient of resistance material in one winding and a zero temperature coefficient of resistance material in the other.

Still another object of my invention is to construct a reactor for controlling the current flowing from a power line into a motor, the impedance voltage across the reactor decreasing from an initial high value to a final low value at rated current.

A further object of my invention is to construct a reactor for controlling the current flowing from a power line into a motor, the inductive voltage drop of the reactor decreasing with time, the resistance voltage drop increasing with time, the decrease in inductive voltage exceeding the increase in resistance voltage.

A still further object of my invention is to utilize a slow reactor in series with a power supply line and a motor to control the voltage supplied to the motor, the reactor made up of two paralleled, inductively coupled and opposed windings, with a resistor in series with each winding, the resistors having different temperature coefficients of resistance.

Other and further objects of my invention reside in the construction and arrangement of the devices and circuits more fully described in the specification hereinafter following by reference to the accompanying drawing in which:

Figure 1 is a schematic diagram of the connection of a pair of windings in my slow impedance device; Fig. 2 shows the connections of my slow electromagnet or reactor with resistance devices in series with the windings; Fig. 3 shows other types of resistors in the circuit of Fig. 2; Fig. 4 shows diagrammatically a slow electromagnet in connection with a direct current motor starter; Fig. 5 shows diagrammatically three slow impedance devices in connection with an alternating current power supply line and a three phase motor; and Fig. 6 shows slow transformers connected in the three-phase, alternating current system of Fig. 5.

The slow electromagnets or slow impedance elements employed in the devices hereinafter described may comprise an even number of windings, half of which are connected in parallel with the other half and magnetically coupled thereto in opposition. In instances of equal current distribution to the two parallel branches there is no magnetism evidenced, but if one branch is made to carry more current, magnetic flux will be produced in proportion to the excess current, within limits. The distribution of current in the parallel branches is controlled by altering the resistances of the paths. This may be done by forming the windings of materials having different temperature coefficients of resistance or including in the separate paths elements formed of materials having different temperature coefficients of resistance. Thus as the current flows through the paths and heats the windings or the elements, the division if the current is altered and magnetism produced.

Referring to the drawing in detail, Fig. 1 shows the windings indicated by reference characters 1 and 2, connected in parallel across the power supply 3. These may be the windings of an electromagnet or an impedance device and are formed of materials having different temperature coefficients of resistance. In order to clearly illustrate the effective resistance of the windings 1 and 2 I have shown in dotted line immediately adjacent each of the windings 1 and 2 the resistances 1a and 2a. That is to say, the inherent resistance of the respective windings is indicated at 1a and 2a. The arrows shown through the resistances 1a and 2a indicate the variability of the resistance with thermal change thereof.

In Fig. 2, reference characters 5 and 6 indicate two inductively coupled and opposed windings, winding 5 having a tungsten or carbon lamp 7 in series with it, and winding 6 having a zero temperature coefficient of resistance element 8 in series with it. The resistance 8 may be omitted or used as representing the resistance component of a winding, the inductance component of which is shown at 6. Switch 9 in the series circuit 5—7 may be employed to open circuit the branch 5—7 of the parallel arrangement, thus converting the circuit from a slow to the conventional type of reactor. Similar conversion means may be employed in any of the slow systems illustrated and may be manually or automatically operated. The power supply is connected at 3 to the parallel arrangement of series circuits 5—7 and 6—8. The windings 5 and 6 may be on an electromagnet or reactor and the tungsten or carbon lamp may be replaced by any other suitable positive or negative temperature coefficient of resistance element.

In Fig. 3 the resistance 8 of Fig. 2 is replaced by a lamp 10. Here the lamp, or equivalent element, 7 may have a positive temperature coefficient of resistance and the lamp or equivalent element 10, a negative temperature coefficient of resistance, or vice versa. Since the disproportionate changes in resistance in the parallel circuits may be effected by use of any one of the combinations shown in Figs. 1, 2 or 3, the slow devices employed in the following circuits are represented as having individually variable and opposed resistive and inductive windings, with the understanding that any one of the systems shown in Figs. 1, 2 or 3 is employed at position X—X in Fig. 4. In order to avoid duplication in drawing, I have arranged the illustration in Fig. 4 so that the circuits of Figs. 1, 2 or 3 may be bodily substituted at position X—X. All the systems have, in effect, individually variable and opposed resistive and inductive windings.

Fig. 4 shows one scheme for the connection of a slow electromagnet for cutting out the resistances 12 and 14 in series with the armature 15 of a direct current motor. The slow electromagnet 17, connected across the lines 11 beyond the switch 18, is energized when the switch is closed. The shunt field 16 of the motor, is simultaneously energized. The initial strength of the slow electromagnet 17 is insufficient to lift armature 19 and connection switch arm 20 against the tension of spring 21. The motor armature 15 therefore receives current through resistances 12 and 14. After the lapse of a time fixed by the change in resistance with heating of the current control means the electromagnet increases in strength sufficiently to lift arm 20 until connection is made between arm 20 and contact point 23, thus cutting out resistance 14 and increasing the motor speed. After a further time, windings 17 strengthen sufficiently to lift arm 20 to the top contact, cutting out resistance 12 and connecting the motor armature 15 directly to the line 11, at which point the motor develops full speed. When the motor is to be stopped, switch 18 is opened, the spring 21 returns arm 20 to the initial position and the current control means cools in a period of time corresponding roughly to the stopping time of the motor so as to be immediately ready for the succeeding operation.

While Fig. 4 illustrates a direct current shunt wound motor with series resistance, it is to be understood that with changes, which are well known to those skilled in the art, slow electromagnets, singly or in groups, may be utilized to introduce the necessary time element in the starting of any type alternating or direct current motor, the electromagnet or electromagnets in each case performing the double function of lifting a core or keeper to actuate switching mechanism and of supplying the time delay in the operation thereof due to the inherent magnetic characteristics of the slow electromagnet.

Fig. 5 shows a three phase power line 25 connected through switches 26 and reactors 27 to the stator windings 28 of an induction motor 28—29. The impedance devices 27 each compose two inductively coupled and opposed windings connected in parallel with each other. When the switches 26 are closed the impedance devices 27 produce a choking effect on the current flowing into the motor windings by reason of the magnetism set up by an unbalanced condition of current in the two opposed windings, which are proportioned so that one is magnetically much stronger than the other when the current control means is cold, that is, the ampere-turns of the one are much greater than the ampere turns of the other. As heat is developed in the current control means, the resistances thereof change disproportionately because of the different temperature coefficients of resistance of the material therein and the effective change in resistance is such as to decrease the amperes and thereby the ampere-turns of the winding producing the greater magnetism. Decreasing magnetism results in a decrease in inductive voltage drop through the reactor, and thus, as the current control means heat, the choking effect lessens and a greater voltage is applied to the motor, smoothly and gradually increasing its speed. As the heating is continued the current control means may reach a temperature at which the ampere-turns of the windings are equal, and if their magnetic interlinkage is practically one hundred percent, all magnetism will disappear and the voltage drop through the impedance device will only be that due to resistance, the IR drop, equal to the current in amperes multiplied by the resistance in ohms. The motor in normal running will receive full line voltage less the IR drop; there will be no iron losses in the impedance device and its power factor will be one hundred percent since there is no magnetism produced.

It is clear that the self-induced or inductive voltage drop must be considerably larger than the resistance drop at starting, otherwise the voltage across the reactor will not fall away sufficiently as the current control means heat. To meet this requirement I may use one or more of the following means:

1. Provide a large ratio of inductive reactance to resistance in the windings.
2. Use a magnetic material core in the reactor and work it so that its permeability falls rapidly in the working range.
3. Use high positive temperature coefficient of resistance material in one and high negative temperature coefficient of resistance material in the other current control means. The increase in resistance with temperature of the one material will be offset by the decrease in resistance of the other.
4. Use high negative temperature coefficient of resistance material in one and substantially zero temperature coefficient of resistance material in the other current control means. In this case the change in resistance will not work against the decrease in inductive voltage but will assist it, that is, as the inductive voltage falls the resistance voltage will also fall.

The selection of the means and the values of elements may be modified in accordance with the requirements of the application of my invention.

Fig. 6 shows a motor control system employing slow transformers and reactors in a three-phase, alternating current motor circuit. Slow reactors 34 are connected in series with the supply lines 25, the switch 26, and the primaries 32a of the slow transformers whose secondaries 32b supply motor windings 28—29. As in Figs. 4 and 5, any of the current control means described in Figs. 1, 2, and 3 may be used in the slow reactors and transformers. As before, any of the circuits of Figs. 1, 2, and 3 may be connected at X—X. I have not duplicated the figures to show the different circuits of Figs. 1, 2 or 3 applied to the slow transformers and reactors of Fig. 6, but it will be understood that all of said circuits are interchangeable in the arrangement of Fig. 6. If the transformer primary windings 32a are connected directly across the supply lines 25 and are designed to produce zero magnetism when cold there may be a considerable initial inrush of current into the primary windings. The series reactors 34 have their maximum magnetism initially, and will therefore function to choke down the current inrush and in effect allow a gradually increasing voltage to be applied to the slow primaries 32a. Thus as the time of operation passes and the current control means heat, the secondary output voltage gradually increases and the motor starts. The slow transformer may be either of the step-up or step-down type.

It is to be understood that the slow reactors 34 are not essential in every case, since the slow transformers 32 embody in the one device both the slow transformer and slow reactor functions. If the slow transformer primaries have negative temperature coefficients of resistance their initial cold resistance may be high enough to limit the inrush current to a suitable value, and as the resistance voltage lowers with heating, the inductive voltage increases to control the current flowing into the primaries. While an induction motor is used in the illustrations in Figs. 5 and 6, it is to be understood that any type of alternating current motor which starts on reduced voltage may be controlled by slow reactors and/or slow transformers as described.

It is evident that a motor may be connected to the line and brought up to speed with slow reactors or slow transformers with a minimum of disturbance to the line voltage, which disturbance is due to excessive starting currents which accompany the use of starters now generally employed. For instance a reactor may be designed to choke the motor current initially below the value necessary to start the motor, and then, as the current control means heat, bring the motor voltage up through infinite steps to practically full line voltage. Slow reactors may be left in the circuit after the motor is running at normal speed, or disconnected by means which are in general use, but which are not described in the illustrations herein.

Slow electromagnets, reactors or transformers, used in motor starting may be converted from slow to instantaneous types by disconnecting one of the two paralleled and opposed windings. Conversion from instantaneous to slow types may be effected by reconnecting the second winding in parallel with the first one. Both conversions may be accomplished with manual switching or by automatic means.

As disclosed in the parent case slow electromagnets and reactors may be made to lose or gain magnetism as the current control means are heated and may be utilized in any suitable manner for the control of motors.

While I have described my invention in certain of its preferred embodiments, I desire it to be understood that modifications may be made and no limitations are intended upon my invention other than may be imposed by the scope of the appended claims.

What I claim as new and desire to secure by Letters Patent of the United States is as follows:

1. An alternating current motor control system comprising a power supply line, a motor and at least one impedor in series with said motor and said supply line, said impedor comprising two inductively coupled and opposed windings connected in parallel one with respect to the other, said windings constituted of materials having different temperature coefficients of resistance for altering the impedance of said impedor with changes in temperature in said impedor.

2. An alternating current motor control system comprising a power supply line, a motor and at least one impedor in series with said motor and said supply line, said impedor comprising two inductively coupled and opposed windings connected in parallel one with respect to the other, said windings constituted of materials having different temperature coefficients of resistance and proportioned to decrease the magnetism of and the inductive drop through said impedor with increased temperature.

3. An alternating current motor control system comprising a power supply line, a motor and at least one impedor in series with said motor and said supply line, said impedor comprising two inductively coupled and opposed windings connected in parallel one with respect to the other, said windings constituted of materials having different temperature coefficients of resistance and proportioned to produce a relatively large amount of magnetism and high inductive voltage drop with the windings at ambient temperature, and substantially zero magnetism and inductive voltage drop when heated by the current flow therethrough.

4. An alternating current motor control system comprising a power supply line, a motor and an impedance device connected in series with said power supply line and said motor, said impedance device comprising at least one unit, said unit including a reactor having two inductively coupled and opposed windings, a resistor connected in series with each winding, one winding and its series resistor being connected in parallel with the other winding and its series resistor, said resistors having different temperature coefficients of resistance for altering the current division to the parallel paths with changes in temperature.

5. An alternating current motor control system comprising a power supply line, a motor and an impedance device connected in series with said power supply line and said motor, said impedance device comprising at least one unit, said unit including a reactor having two inductively coupled and opposed windings, a resistor connected in series with each winding, one winding and its series resistor being connected in parallel with the other winding and its series resistor, one of said resistors being formed of material having a positive temperature coefficient of resistance, the other of said resistors being formed of material having a negative temperature coefficient of resistance.

6. An alternating current motor control system comprising a power supply line, a motor and an impedance device connected in series with said power supply line and said motor, said impedance device comprising at least one unit, said unit including a reactor having two inductively coupled and opposed windings, a resistor connected in series with each winding, one winding and its series resistor being connected in parallel with the other winding and its series resistor, one of said resistors being formed of material having a positive temperature coefficient of resistance, the other of said resistors being formed of material having substantially zero temperature coefficient of resistance.

7. An alternating current motor control system comprising a power supply line, a motor and an impedance device connected in series with said power supply line and said motor, said impedance device comprising at least one unit, said unit including a reactor having two inductively coupled and opposed windings, a resistor connected in series with each winding, one winding and its series resistor being connected in parallel with the other winding and its series resistor, one of said resistors being formed of material having a negative temperature coefficient of resistance, the other of said resistors being formed of material having substantially zero temperature coefficient of resistance.

8. An alternating motor control system comprising a power supply line, a motor and electromagnetic control means in circuit with said supply and said motor, said control means including slow transformers connected between said supply and said motor and slow reactors connected between said transformers and said supply, said reactors having an initial high reactance varying to a final low reactance in a time period following connection of said supply, said slow reactors effecting a temporary choke on the current to said transformers.

9. An alternating current motor control system comprising a power supply line, a motor, at least one impedor connected in series with said power supply line and said motor, said impedor comprising two inductively coupled and opposed windings connected in parallel one with respect to the other, one winding being formed of material having a positive temperature coefficient of resistance, and the other being formed of material having a negative temperature coefficient of resistance, coacting to maintain the total resistance constant.

10. An alternating current motor control system comprising a power supply line, a motor, at least one impedor connected in series with said power supply line and said motor, said impedor comprising two inductively coupled and opposed windings connected in parallel one with respect to the other, one winding being formed of material having a positive temperature coefficient of resistance, the other being formed of material having substantially zero temperature coefficient of resistance.

11. An alternating current motor control system comprising a power supply line, a motor, at least one impedor connected in series with said power supply line and said motor, said impedor comprising two inductively coupled and opposed windings connected in parallel one with respect to the other, one winding constituted of material having a negative temperature coefficient of resistance, the other constituted of material having substantially zero temperature coefficient of resistance, said constitution of said windings acting to decrease both the inductive voltage drop and the resistance voltage drop with increasing temperature.

12. An alternating current motor control system comprising a power supply line, a motor, at least one electromagnetic control device in circuit with said supply line and said motor, said device comprising a transformer with its primary winding connected to said supply line and its secondary winding connected to said motor, at least one winding comprising two inductively coupled and opposed coils connected in parallel one with respect to the other and formed of materials having substantially different temperature coefficients of resistance.

13. An alternating current motor control system comprising a power supply line, a motor, at least one electromagnetic control device in circuit with said power supply line and said motor, said device comprising a transformer with its primary winding connected to said supply line and its secondary winding connected to said motor, at least one winding comprising two inductively coupled and opposed coils connected in parallel one with respect to the other, at least one of said coils having a resistor in series therewith, said resistor constituted to alter in resistance with temperature changes in the resistor, said windings and said resistor constituting means to alter the magnetic condition of said transformer with changes in temperature of said resistor to control the current passing from said power supply line to said motor.

14. A motor control system comprising a power supply line, a motor connected thereto through electromagnetic control means, said means including at least one magnetic regulating device, said device having a moving core as part of its magnetic structure, and comprising two windings connected in parallel one with respect to the other, inductively coupled and opposed, said windings formed of materials having different temperature coefficients of resistance, the changes in temperature of said windings, the movement of said core, the changing impedance of said windings and the changes in electromagnetic induction therebetween mutually cooperating to effect changes over a time period in the current flowing to said motor.

15. A motor control system comprising a power supply line, a motor connected thereto through electromagnetic control means, said control means comprising two windings connected in parallel one with respect to the other, inductively coupled and opposed, and constituted by materials having different temperature coefficients of resistance, the changes in temperature of said windings, the changes in impedance of said windings, and the changes in electromagnetic induction therebetween, mutually cooperating to effect changes over a time period in the current flowing to said motor.

16. A motor control system comprising a power supply line, a motor connected thereto, electromagnetic control means in series with said motor and said line, said electromagnetic control means comprising a core of magnetic material having a movable portion, a pair of windings on said core, said windings inductively coupled and opposed, a resistor connected in series with each winding, one winding and its series resistor being connected in parallel with the other winding and its series resistor, said resistors having different temperature coefficients of resistance for altering the current divisions to the parallel paths with changes in temperature in the resistors, said electromagnetic control means as a whole functioning as a combined moving core electromagnet, impedor and transformer to alter the current supplied to said motor from said line over a time period.

17. A motor control system comprising a power supply line, a motor connected thereto, and a magnetic regulating device as the control means in series with said supply line and said motor, said device comprising a core of magnetic material having a movable portion, a pair of inductively coupled and opposed windings supported on said core, said windings connected in parallel one with respect to the other and constituted by materials having different temperature coefficients of resistance, the movement of said movable core portion, changes in the electromagnetic induction between said windings, and changes in the resistance of said windings with temperature, mutually cooperating to alter the voltage applied to said motor over a time period.

18. A motor control system comprising a power supply line, a motor connected thereto, and a magnetic regulating device as the control means in series with said supply line and said motor, said device comprising two inductively coupled and opposed windings connected in parallel one with respect to the other and constituted by materials having different temperature coefficients of resistance, the changes in temperature in said windings, the changes in impedance of said windings, and the changes in transformer action between said windings, mutually cooperating to effect changes over a time period in the voltage applied to said motor.

19. A motor control system comprising a power supply line, a motor connected thereto, and a magnetic regulating device as the control means in series with said supply line and said motor, said device comprising a core of magnetic material having a movable portion, a pair of inductively coupled and opposed windings supported on said core, said windings connected in parallel one with respect to the other, at least one of said windings having a resistor in series with it within the parallel connection, said resistor constituted by material whose resistance changes with temperature, the movement of said movable core portion, changes in the electromagnetic induction between said windings, and changes in the resistance of said resistor with temperature, mutually cooperating to alter the voltage applied to said motor over a time period.

20. An alternating current motor starting system comprising a power supply line, a motor, and at least one impedor in series with said motor and said supply line, said impedor comprising two inductively coupled and opposed windings connected in parallel one with respect to the other, at least one of said windings being constituted by material which changes in resistance with the current passing through it as said motor is started, to alter the impedance of said impedor.

21. An alternating current motor starting system comprising a power supply line, a motor, and at least one impedor in series with said motor and said supply line, said impedor comprising two inductively coupled and opposed windings connected in parallel one with respect to the other, at least part of one of said windings being constituted by material which changes in resistance with the current passing through it as said motor is started, to alter the impedance of said impedor.

22. An alternating current motor starting system comprising a power supply line, a motor, and an impedance device connected in series with said power supply line and said motor, said impedance device comprising at least one unit, said unit including a reactor having two inductively coupled and opposed windings, a resistor connected in series with one winding within the parallel connection, said resistor being constituted by material which changes in resistance with the current passing through it as said motor is started, to alter the impedance of said impedance device.

23. An alternating current motor starting system comprising a power supply line, a motor, and at least one impedor in series with said motor and said supply line, said impedor comprising two inductively coupled and opposed windings connected in parallel one with respect to the other, at least part of one of said windings being constituted by material the resistance of which decreases as the starting current of said motor through it decreases.

24. An alternating current motor starting system comprising a power supply line, a motor, and an impedance device connected in series with said power supply line and said motor, said impedance device comprising at least one unit, said unit including a reactor having two inductively coupled and opposed windings, and a resistor connected in series with one winding within the parallel connection.

ALBERT B. RYPINSKI.